United States Patent [19]

Erlam et al.

[11] 4,433,788
[45] Feb. 28, 1984

[54] ENCLOSURES FOR ELECTRICAL AND ELECTRONIC EQUIPMENT

[75] Inventors: David P. Erlam, Winchester; Thornton N. J. Archard, Epsom, both of England

[73] Assignee: BICC Public Limited Company, London, England

[21] Appl. No.: 257,149

[22] Filed: Apr. 24, 1981

[51] Int. Cl.$^3$ ............................................... A47F 7/00
[52] U.S. Cl. ....................................... 211/26; 52/222; 52/224; 108/153; 211/189; 312/257 SK; 312/257 SM
[58] Field of Search .................. 211/26, 189; 248/165, 248/150; 52/222, 224, 656, 291; 269/48.1; 312/257 SK, 257 SM; 108/111, 153

[56] References Cited

U.S. PATENT DOCUMENTS

| | | | |
|---|---|---|---|
| 2,429,053 | 10/1947 | Forbes | 269/48.1 X |
| 2,577,317 | 12/1951 | Eschrich | 108/3 |
| 3,062,335 | 11/1962 | Baxter | 52/222 |
| 3,114,528 | 12/1963 | Forest | 411/55 X |
| 3,182,846 | 5/1965 | Kaff | 108/156 X |

FOREIGN PATENT DOCUMENTS 195713  4/1965  Sweden ............................. 108/111

Primary Examiner—Ramon S. Britts
Assistant Examiner—David L. Talbott
Attorney, Agent, or Firm—Buell, Blenko, Ziesenheim & Beck

[57] ABSTRACT

A simple and inexpensive skeleton frame for a fabricated structure for housing electrical equipment comprises upstanding legs which are arranged at the corners of the frame and which are secured together at the top and bottom of the frame by endless flexible frame metal bands surrounding the legs and maintained in tension by bracing devices positioned between the legs. Each bracing device comprises a central hub, elongate braces extending outwardly from the hub and each engaging a leg, and screw threaded adjustable means for urging the braces outwardly to maintain the endless band under such a tension that the frame is held rigid. The bottom, sides and top of the frame are clad with sheet metal and a hinged door.

14 Claims, 2 Drawing Figures

ENCLOSURES FOR ELECTRICAL AND ELECTRONIC EQUIPMENT

This invention relates to cabinets, cases, racks and other fabricated structures made wholly or partly of metal or metal alloy for housing and/or supporting electrical and/or electronic sub-racks, chassis and other equipment.

Cabinets, cases, racks and other fabricated structures hitherto employed to house and/or support electrical and/or electronic equipment generally comprise a skeleton frame comprising substantially rigid upstanding legs of metal or metal alloy which are arranged at spaced positions around the periphery of the frame and which are secured together at at least the top and bottom of the frame in such a way as to render the frame substantially rigid and, secured to the frame, a base, top and side walls of sheet metal or metal alloy or other sheet material, at least one of the side walls generally, but not necessarily, being in the form of a door. Usually the upstanding legs are connected together at the top and bottom of the frame by rigid support members, each of which extends between and is permanently or detachably secured to adjacent legs, for example by bolts, rivets or welding. The upstanding legs and support members contribute to a substantial extent to the rigidity of the enclosure and the support members also provide location for the legs, thereby ensuring the necessary dimensional accuracy of the frame. It is the current practice to make the support members in the form of die-castings, of steel angle or aluminium extrudate, or of structural foam plastics material, because, in all these cases, the mass of the material of the support members provides a major contribution to the necessary strength and rigidity of the frame.

It is the object of the present invention to provide a simple and inexpensive skeleton frame for a fabricated structure for housing and/or supporting electrical and/or electronic equipment, which frame can be readily and easily assembled by semi-skilled or unskilled personnel.

According to the invention, the improved skeleton frame comprises substantially rigid upstanding elongate members which are arranged at spaced positions around the periphery of the frame and which are secured together at each of at least two positions spaced along their lengths, wherein, at at least one, and preferably at each, of said positions the upstanding elongate members are secured together by an endless flexible band of metal or metal alloy which surrounds the members and is maintained in tension by a bracing device positioned between the elongate members and comprising a central hub, a plurality of substantially rigid, elongate bracing members extending outwardly from the hub and each engaging one of the upstanding elongate members, and adjustable means urging the bracing members outwardly in the directions of their lengths to maintain the endless band under such a tension that the frame is held substantially rigid.

The skeleton frame may be of any desired cross-section but, preferably, the frame is of substantially rectangular cross-section with an upstanding member positioned at each of its four corners and with the four upstanding members secured together at each of the top and bottom of the frame to render the frame substantially rigid by means of an endless flexible band and associated bracing device as hereinbefore described.

Where the height of the skeleton frame is substantially greater than its transverse dimensions, the upstanding members may also be secured together by means of an endless flexible band and associated bracing device as hereinbefore described at at least one intermediate position between the top and bottom of the frame.

By virtue of the fact that the upstanding members are secured together by endless bands of metal or metal alloy and associated bracing devices, the use of support members of substantial mass to provide the necessary strength and rigidity is eliminated and the upstanding members and bracing members can be of light metal, e.g. steel, thereby providing the necessary strength and rigidity with a substantial reduction in the mass of material employed.

Preferably, the adjustable means urging the bracing members outwardly in the directions of their lengths towards the upstanding members to maintain the endless band in tension is a single adjustable device by means of which outward movement of all the bracing members can be effected concurrently.

In a preferred embodiment, the or each bracing device comprises a central hub assembly comprising a collar having a tapered bore whose boundary wall is defined at least in part by the inner ends of the bracing members, a conical plug of a shape complementary to that of the tapered bore of the collar, and adjustable means for drawing or urging the plug axially into the tapered bore of the collar to engage the inner ends of the bracing members and urge the bracing members outwardly. The adjustable means may comprise a screw which passes through a hole in the plug and is in screw threaded engagement in a tapped hole in a disc which is separately formed with respect to the inner ends of the bracing members.

Preferably, the outer end of each bracing member is of a shape complementary to the transverse cross-sectional shape of the associated upstanding member and preferably, also, the outer end of each bracing member positively engages with the associated upstanding member to prevent movement of the bracing member lengthwise of the upstanding member. For this purpose, the outer end of each bracing member may have at least one spigot which engages in a hole or recess in the associated upstanding member. To provide for use of the bracing device in skeleton frames including upstanding members of transverse cross-sections differing from one another, each bracing member may have detachably secured to its outer end a nose piece selected from a group of nose pieces of shapes differing from one another.

The endless flexible band may have an endless inwardly directed flange to which a separately formed base or top wall or a separately formed shelf can be detachably secured but, preferably, the endless flexible band is integral with a substantially flat base or top wall or with a substantially flat shelf. To provide for location of the upstanding members, in both cases the endless flexible band may have a second endless inwardly directed flange against which the upstanding members are urged by the associated bracing device and, in this case, preferably a separately formed corner unit is clamped between the endless band and each upstanding member and is engaged by the spigot or other means serving to prevent movement of the associated bracing member lengthwise of the upstanding member. Alternatively, along parts of the length of the endless flexible band between adjacent upstanding members, the band may have an inwardly directed flange, the ends of adjacent flanges defining an opening for location of an upstanding member.

The invention also includes a kit of parts for fabrication of a skeleton frame as hereinbefore described. Such a kit of parts can be packed flat and can therefore be readily stored and transported.

The invention further includes a cabinet, case, rack or other fabricated structure having a skeleton frame as hereinbefore described.

The invention will be further illustrated by a description, by way of example, of a preferred skeleton frame for use in the fabrication of a cabinet for housing electronic and/or electrical sub-racks with reference to the accompanying drawings, in which.

Figure 1:
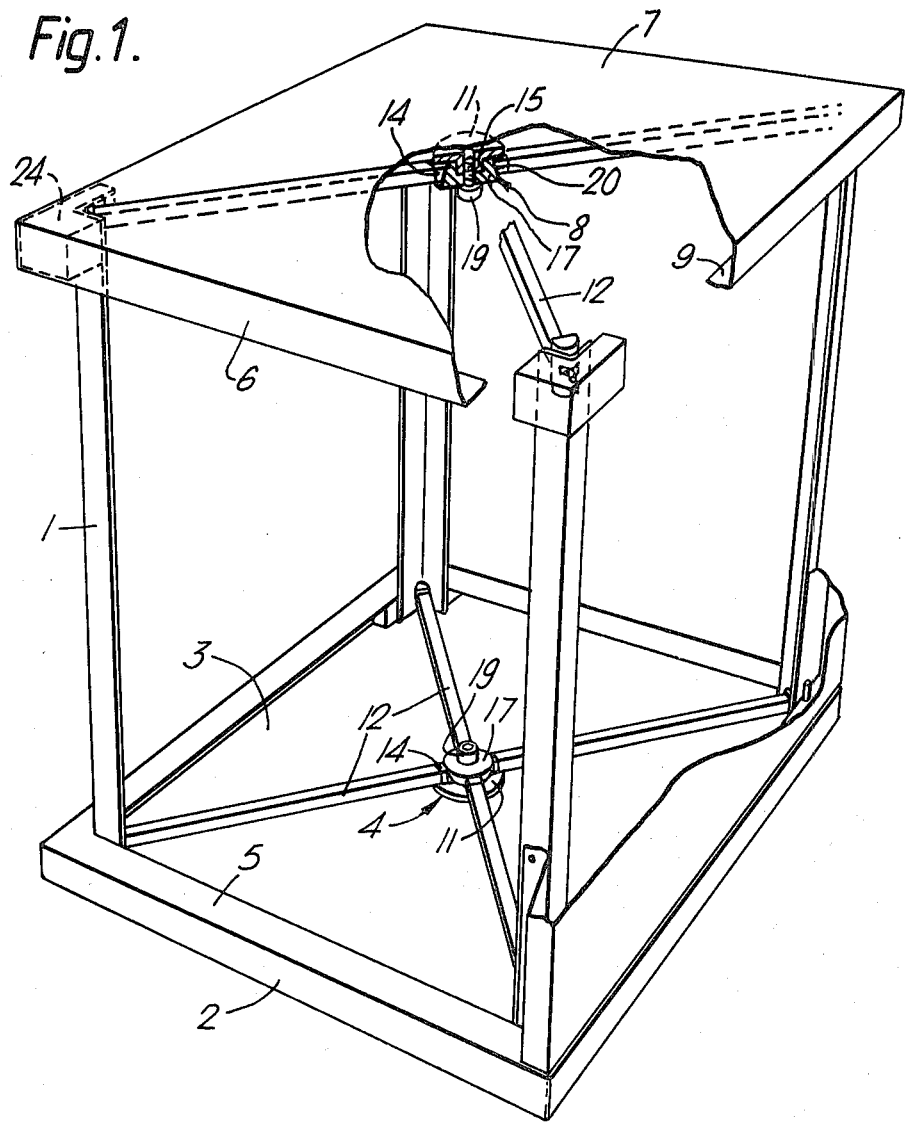
FIG. 1 is an isometric view of the fabricated skeleton frame.
Figure 2:
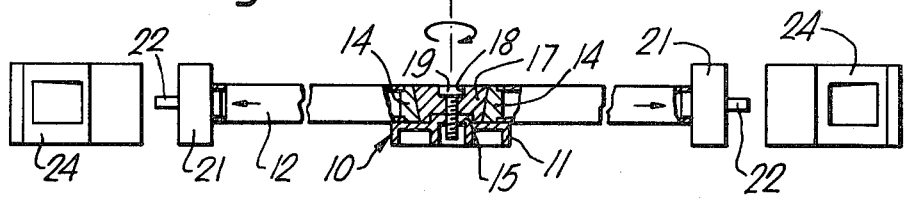
FIG. 2 is a side view, partly in section and partly in elevation, of one of the bracing devices of the skeleton frame shown in FIG. 1.

Referring to the drawings, the skeleton frame is of substantially rectangular cross-section and comprises four steel angles 1 constituting the upstanding members or legs of the frame, an endless flexible steel band 2 surrounding the bottom of the legs and integral with a substantially flat base wall 3, an endless flexible steel band 6 surrounding the top of the legs and integral with a substantially flat top wall 7, and associated bracing devices 4 and 8 which maintain the bands in tension as will hereinafter be described and thereby render the frame substantially rigid.

The endless band 2 has an endless inwardly directed flange 5 and the endless band 6 has an endless inwardly directed flange 9 the four corners of the flanges 5 and 9 serving to locate the four legs 1.

The two bracing devices 4 and 8 are substantially identical and each comprises a central hub assembly 10 and four outwardly extending bracing members 12 each consisting of an extruded tube of steel. The hub assembly 10 comprises four tapered tailpieces 14 which are detachably secured to the inner ends of the bracing members 12, a disc 11 which has a tapped boss 15, and, slidable in the space bounded by the tapered tailpieces, a conical plug 17 which is of a shape complementary to that of the tapered tailpieces. A screw 19 passes through a hole 18 in the plug 17 and engages in the tapped boss 15 to urge the plug axially into the space bounded by the tapered tailpieces 14. Detachably secured at the outer end of each bracing member 12 is a separately formed nose piece 21, which, at its free end, is curved convexly and is complementary to the concave shape of a leg 1 and which has a spigot 22 which protrudes through slot 23 in the leg and engages in a hole in a L-shaped corner unit 24 positioned between the leg and the band 2 or 6 to secure the bracing member positively with respect to the leg.

In fabricating the skeleton frame, the conical plug 17 of the hub assembly 11 of the lower bracing device 4 is removed, and the bracing device is positioned in the endless band 2. With the separately formed corner units 24 positioned in the corners of the endless band 2 and the legs 1 positioned in the corners defined by the flange 5, the spigots 22 on the nose pieces 21 of the bracing members 12 are inserted through the slots 23 in the legs and are positively engaged with the holes in the corner units, and the conical plug 17 is urged into the space bounded by the tapered tailpieces 14 by initially screwing the screw 19 into the tapped boss 15 to give a small degree of loading to the assembly. The screw 19 is then tightened down to apply tension to the band 2 and to clamp the lower ends of the legs 1 effectively between the band and the bracing members 12.

The same procedure is repeated for the top of the skeleton frame.

Once the skeleton frame has been braced to form a substantially rigid structure, the bottom, sides and top may be clad with sheet metal (which may be so shaped as to mask the legs 1 and fittings) and a hinged door fitted.

What we claim as our invention is:

1. A skeleton frame for a fabricated structure for housing electrical equipment, which skeleton frame comprises at least three substantially rigid upstanding elongate members which are arranged at spaced positions around the periphery of the frame and which are secured together at each of at least two positions spaced along their lengths wherein, at at least one of said positions the upstanding elongate members are secured together by an endless flexible band of metal or metal alloy which surrounds the members and is maintained in tension by at least one bracing device positioned between the elongate members and comprising a central hub, a plurality of substantially rigid, elongate bracing members extending radially outwardly from the hub and each engaging one of the upstanding elongate members, and adjustable means urging the bracing members outwardly in the directions of their lengths to maintain the endless band under such a tension that the frame is held substantially rigid.

2. A skeleton frame for a fabricated structure for housing electrical equipment, which skeleton frame is of substantially rectangular cross-section and comprises at least three substantially rigid upstanding elongate members which are arranged one at each of the four corners of the frame and which are secured together at each of the top and bottom of the frame by an endless flexible band of metal or metal alloy which surrounds the members and is maintained in tension by at least one bracing device positioned between the elongate members and comprising a central hub, four substantially rigid elongate bracing members extending radially outwardly from the hub and each engaging one of the upstanding elongate members, and adjustable means urging the bracing members outwardly in the directions of their lengths to maintain the endless band under such a tension that the frame is held substantially rigid.

3. A skeleton frame as claimed in claim 2, wherein the upstanding members are also secured together by means of an endless flexible band and associated bracing device, substantially identical to those associated with the top and bottom of the frame, at at least one intermediate position between the top and bottom of the frame.

4. A skeleton frame as claimed in claim 1 or 2, wherein the adjustable means urging the bracing members of the at least one bracing device outwardly in the direction of their lengths towards the upstanding members to maintain the endless band in tension is a single adjustable device by means of which outward movement of all the bracing members can be effected concurrently.

5. A skeleton frame as claimed in claim 4, wherein the at least one bracing device comprises a central hub assembly comprising a collar having a tapered bore whose boundary wall is defined at least in part by the inner ends of the bracing members, a conical plug of a shape complementary to that of the tapered bore of the collar, and adjustable means for causing the plug to move axially into the tapered bore of the collar to engage the inner ends of the bracing members and urge the bracing members outwardly.

6. A skeleton frame as claimed in claim 5, wherein the adjustable means of the at least one bracing device comprises a screw which passes through a hole in the conical plug and is in screw threaded engagement in a tapped hole in a disc which is separately formed with respect to the inner ends of the bracing members.

7. A skeleton frame as claimed in claim 5, wherein each bracing member has a separately formed tailpiece detachably secured to its inner end and defining said tapered bore.

8. A skeleton frame as claimed in claim 1 or 2, wherein the outer end of each bracing member is of a shape complementary to the transverse cross-sectional shape of the associated upstanding member.

9. A skeleton frame as claimed in claim 1 or 2, wherein the outer end of each bracing member positively engages with the associated upstanding member to prevent movement of the bracing member lengthwise of the upstanding member.

10. A skeleton frame as claimed in claim 9, wherein the outer end of each bracing member has at least one spigot which engages in a hole or recess in the associated upstanding member.

11. A skeleton frame as claimed in claim 1 or 2, wherein each bracing member has detachably secured to its outer end a nose piece selected from a group of nose pieces of shapes differing from one another.

12. A skeleton frame as claimed in claim 1 or 2, wherein the endless flexible band is integral with a substantially flat end wall.

13. A skeleton frame as claimed in claim 1 or 2, wherein the endless flexible band has an endless inwardly directed flange against which the upstanding members are urged by the associated bracing device.

14. A skeleton frame as claimed in claim 13, wherein a separately formed corner unit is clamped between the endless flexible band and each upstanding member.

* * * * *